(12) United States Patent
Barton et al.

(10) Patent No.: US 7,086,050 B2
(45) Date of Patent: Aug. 1, 2006

(54) UPDATING COMPUTER FILES

(75) Inventors: Christopher Andrew Barton, Buckingham (GB); Kristian John Pine, Aylesbury (GB); Paul Nicholas Gartside, Milton Keynes (GB)

(73) Assignee: McAfee, Inc., Santa Clara, CA (US)

( * ) Notice: Subject to any disclaimer, the term of this patent is extended or adjusted under 35 U.S.C. 154(b) by 593 days.

(21) Appl. No.: 09/944,114

(22) Filed: Sep. 4, 2001

(65) Prior Publication Data

US 2002/0016959 A1 Feb. 7, 2002

Related U.S. Application Data

(63) Continuation-in-part of application No. 09/633,358, filed on Aug. 4, 2000.

(51) Int. Cl.
*G06F 9/44* (2006.01)

(52) U.S. Cl. ............... 717/173; 717/171; 717/172; 717/168

(58) Field of Classification Search ........ 717/168–173, 717/102–103, 120–122, 174–178
See application file for complete search history.

(56) References Cited

U.S. PATENT DOCUMENTS

| | | | |
|---|---|---|---|
| 4,763,271 A | 8/1988 | Field | |
| 5,577,244 A | 11/1996 | Killebrew et al. | |
| 5,732,275 A | 3/1998 | Kullick et al. | |
| 5,809,287 A | 9/1998 | Stupek, Jr. et al. | |
| 5,813,007 A * | 9/1998 | Nielsen | 707/10 |
| 5,896,566 A * | 4/1999 | Averbuch et al. | 455/149 |
| 5,913,040 A | 6/1999 | Rakavy et al. | |
| 5,919,247 A | 7/1999 | Van Hoff et al. | |
| 5,933,645 A | 8/1999 | Wallack | |
| 5,933,647 A | 8/1999 | Aronberg et al. | |
| 5,940,074 A | 8/1999 | Britt, Jr. et al. | |
| 6,031,830 A | 2/2000 | Cowan | |
| 6,035,423 A * | 3/2000 | Hodges et al. | 714/38 |
| 6,038,601 A | 3/2000 | Lambert et al. | |
| 6,123,737 A | 9/2000 | Sadowsky | 717/11 |
| 6,151,643 A * | 11/2000 | Cheng et al. | 710/36 |
| 6,192,518 B1 * | 2/2001 | Neal | 717/175 |
| 6,212,557 B1 * | 4/2001 | Oran | 709/221 |
| 6,353,926 B1 * | 3/2002 | Parthesarathy et al. | 717/170 |
| 6,360,366 B1 | 3/2002 | Heath et al. | |

(Continued)

FOREIGN PATENT DOCUMENTS

EP 0811942 12/1997

(Continued)

OTHER PUBLICATIONS

Search Report from European Patent Application No. 02254593.3-2211.

*Primary Examiner*—Kakali Chaki
*Assistant Examiner*—Jason Mitchell
(74) *Attorney, Agent, or Firm*—Zilka-Kotab, PC; Christopher J. Hamaty

(57) ABSTRACT

A computer file update triggering technique uses tags embedded within e-mail messages sent to connected computers to indicate the existence of an updated version of a computer file to those connected computers. The connected computers may then automatically download the updated version of the computer file. The notification via e-mail of the existence of the updated computer files may be provided as a subscription service by the computer file provider.

18 Claims, 8 Drawing Sheets

U.S. PATENT DOCUMENTS

| | | |
|---|---|---|
| 6,516,338 B1 | 2/2003 | Landsman et al. |
| 2002/0049610 A1* | 4/2002 | Gropper .................... 705/1 |
| 2003/0009753 A1* | 1/2003 | Brodersen et al. .......... 717/172 |
| 2003/0018527 A1 | 1/2003 | Filepp et al. |

FOREIGN PATENT DOCUMENTS

| | | |
|---|---|---|
| JP | 0 993 163 | 4/2000 |
| JP | 137641 A2 | 5/2000 |

* cited by examiner

X - McAfee-sig: <S#-xxx E#-YYY D#-ZZZ>

UPDATING COMPUTER FILES

This application is a Continuation-In-Part application based upon U.S. patent application Ser. No. 09/633,358 filed on 4 Aug. 2000.

BACKGROUND OF THE INVENTION

1. Field of the Invention

This invention relates to the field of computers. More particularly, this invention relates to mechanisms for the updating of computer files 2. Description of the Prior Art A problem in the field of computing is the requirement for regular updating of computer files (possibly by downloading a complete new version of the file or by an incremental update in which modifying data for modifying the existing file to form the updated version is downloaded) held on many different computers. A software update may be required because the program has altered in response to the occurrence of bugs within the program or to add additional functionality to a program. Another need for frequent computer file updates is when the computer file represents rapidly evolving data needed by the computer. An example of this is the computer virus definitions data that is used by many anti-virus computer programs. This computer virus definition data is typically updated when a new virus is encountered such that the anti-virus software may provide counter-measures to the new virus. In order that the anti-virus software being used may operate in an effective manner it is important that it should use the most up to date virus definition data.

In response to this need, anti-virus software suppliers often provide download facilities from which users can download the most up to date versions of the computer virus definition data. One problem with this approach is that a user must know that an updated virus definition data file is present in order that it should be downloaded. One way to deal with this is to configure the computer program software to automatically check for new computer virus definition data at periodic intervals. If these intervals are made too short, then this presents an unnecessary burden upon the computer systems involved. Conversely, if the intervals are made too large, then a significant update required to deal with a new virus threat may not be downloaded in sufficient time to adequately protect from that virus threat.

A further problem associated with the downloading of virus definition data from the anti-virus software supplier is that peak demand for the download of the new data may cause the systems to malfunction. Computer viruses are becoming increasingly common and destructive. With this background, the release of a new computer virus attracts considerable media attention resulting in many users simultaneously trying to download the updated data in a manner that causes this process to fail.

Various techniques for updating software are disclosed in U.S. Pat. No. 5,940,074, U.S. Pat. No. 4,763,271, U.S. Pat. No. 5,919,247, U.S. Pat. No. 5,577,244, U.S. Pat. No. 5,809,287, U.S. Pat. No. 5,933,647 and U.S. Pat. No. 5,732,275. A technique for updating anti-virus DAT files via a "push" method is disclosed in U.S. Pat. No. 6,035,423.

With conventional "pull" techniques for updating computer files the provider of the updated computer file has relatively little control over the download demand. In critical situations the resources of the provider to enable download by remote computers may be overwhelmed resulting in denial of download to some users. It may be that in these circumstances download of an updated computer file to highly critical corporate mail servers, firewalls and file servers would be denied whereas download to a relatively unexposed home user would be granted.

SUMMARY OF THE INVENTION

Viewed from one aspect this invention provides a method performed by a provider of a computer file to trigger updating of said computer file used by a computer, said method comprising the steps of:

(i) providing an updated version of said computer file at a location from which it may be downloaded by said computer;

(ii) sending a tag indicative of availability of said updated computer file to said computer.

The invention provides a mechanism whereby the provider of a computer file that is updated may trigger the pull downloading (or other update mechanism) of that updated computer file by their customers in a manner which gives the provider control over which computers are triggered to download the computer file. In particular, known highly critical computers and/or computers at a high risk may be immediately triggered to download the updated computer file as soon as it is available, and potentially automatically without requiring administrative intervention, whilst lower priority computers or computers at less risk may not be so triggered. Furthermore, the provision of such a triggering mechanism to automatically initiate a high priority download of the latest version of a computer file may be provided as a service to specific customers, possibly associated with a subscription fee.

It will be appreciated that the tag to initiate the downloading could take a wide variety of different forms. As an example, it would be possible for the tag to be embedded within internet data being passed to a computer via the provider's proxy server, firewall, gateway etc. However, in preferred embodiments of the invention the tag forms part of an e-mail message, such as being embedded within the header of an e-mail message, which is sent from the provider to the computer (user) which is registered for the service.

The widespread availability of e-mail messaging mechanisms and their association with anti-virus scanning systems makes them a particularly convenient way for passing such tag messages and having the tags recognised by appropriate software that will perform the updating.

It will be appreciated that the computer file to be updated could take a wide variety of forms, such as database data, computer program data etc, but the invention is particularly well suited to the field of anti-virus computer systems in which the computer file to be updated may be computer virus definition data, anti-virus computer programs or scanning engine programs.

In preferred embodiments the provider of the computer file and the service maintains a database of addresses to be sent the tag message when the updated computer file becomes available. A user may pay to be included within this database and accordingly receive the tag and priority updating. Different levels of service may be provided to different users depending upon the nature of a user, and possibly the amount of the fee paid, with priority data being associated within the database with the data identifying each computer and this priority data being used to control when the tag is sent to the computer concerned.

The computer to be updated and the storage location of the updated computer file could be physically separated and connected via a remote link, such as an internet link. In some circumstances the source and the computer to be updated may be more locally provided. It will be appreciated that the source of the tag sent to the computers may be physically separated from the storage location of the updated computer file. Furthermore, a plurality of storage locations of the updated computer file could be provided for use by different computers and one or more sources of tag sent to computers may similarly be provided in the same or different locations.

Complementary aspects of the present invention also provide a computer program product for controlling a computer in accordance with the above-described technique and an apparatus for performing the above-described technique.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
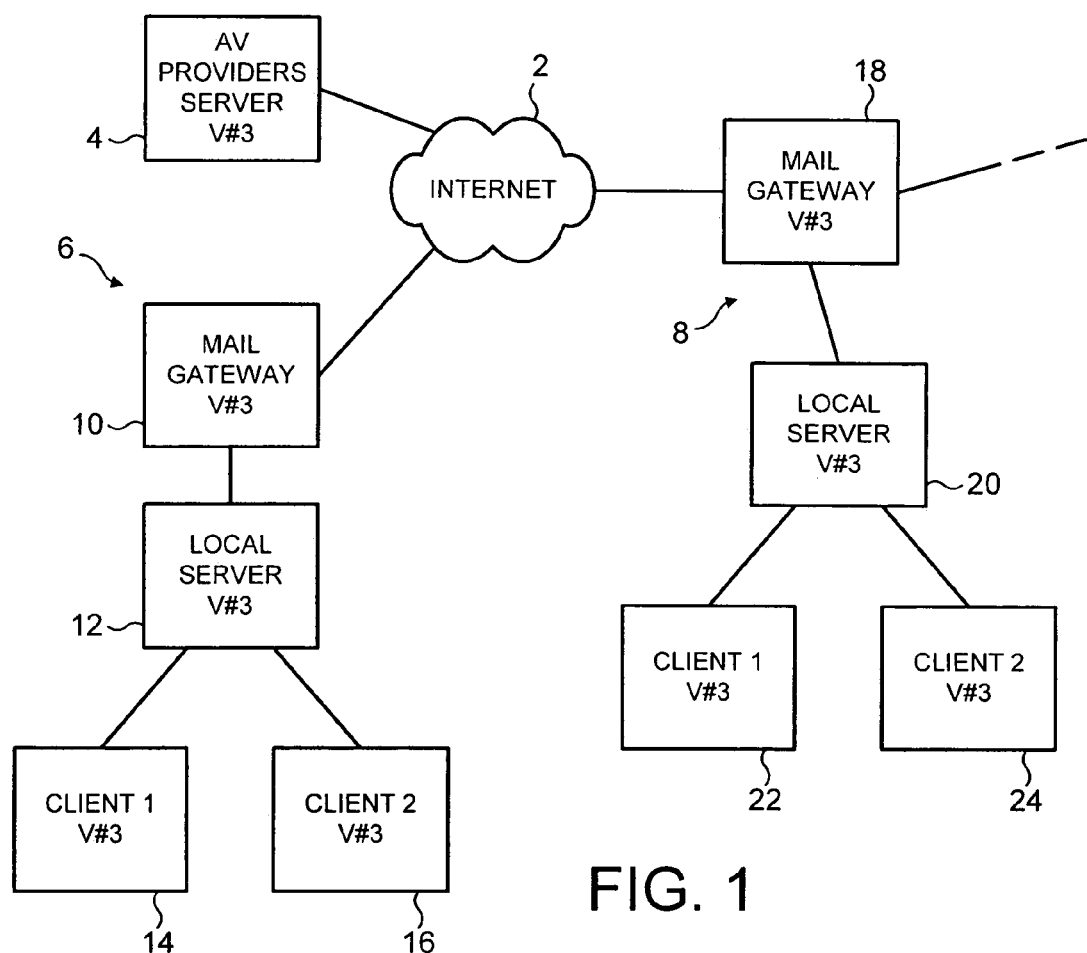
FIGS. 1, 2 and 3 illustrate operation of the technique of the present invention in distributing notification of the existence of an update and triggering download of an update.

FIG. 1 shows a plurality of computers linked via the internet 2 (or some other communication link). A software supplier provides an FTP server 4 from which updated versions of a computer file may be downloaded. FIG. 1 illustrates a first local area network 6 and a second local area network 8 linked to the internet 2. The first local area network 6 includes a mail gateway computer 10, a local server 12 and two client workstations 14, 16. In a similar way the second local area network 8 includes a mail gateway 18, a local server 20 and two client workstations 22, 24.

Using known e-mail protocols and computer programs, the various workstation computers 14, 16, 22, 24 shown in FIG. 1 exchange e-mail messages. In alternative embodiments the data exchange could take other forms, such as internet web pages or word processing files that contain headers or the like in which tags for triggering updates may be embedded. All of the computers illustrated in FIG. 1 utilise anti-virus software that requires access to an up to date computer virus definition data file. As users of this computer virus definition data file the various mail gateway, server and workstation computers are peers. The illustrated starting situation in FIG. 1 is that all of the computers are running the most up to date version (#3) of the computer file that is the version currently stored on the FTP server 4.

Figure 2:
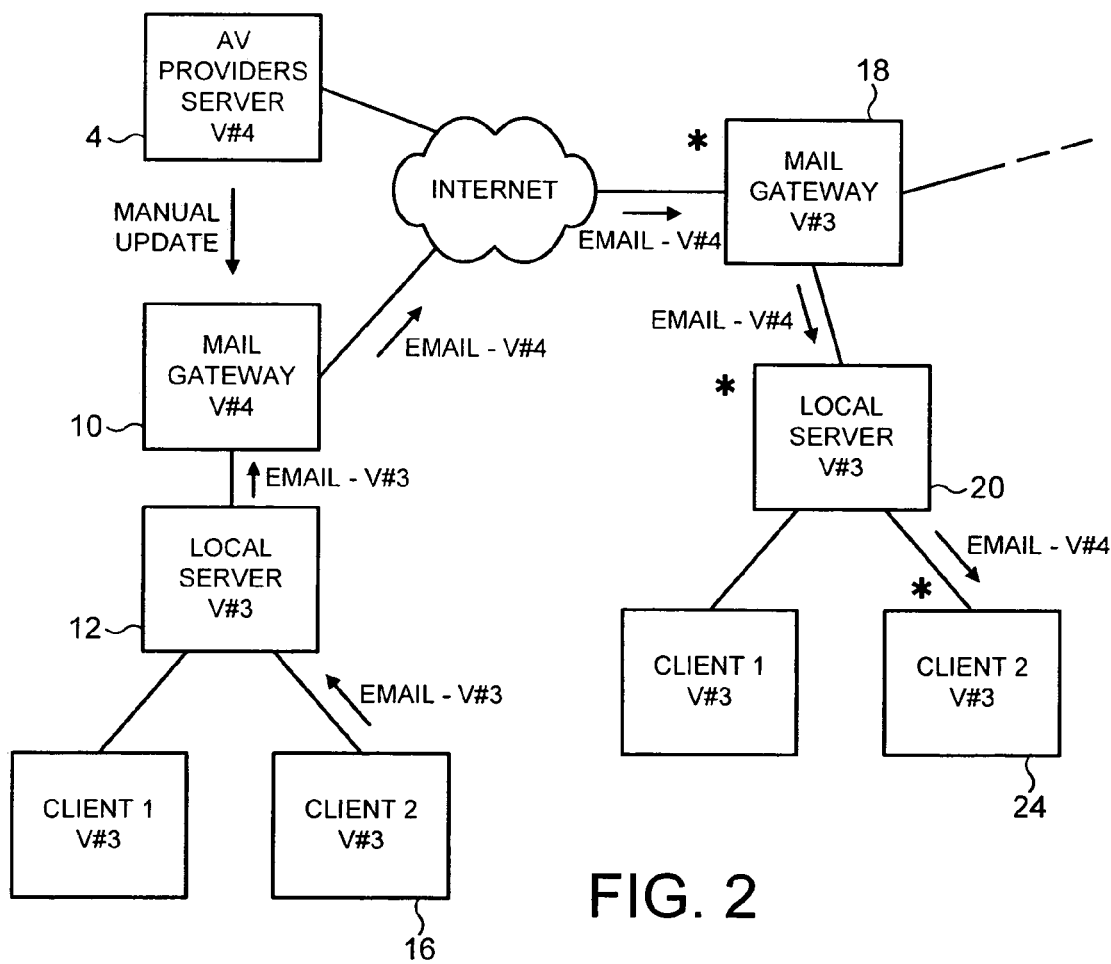

FIG. 2 illustrates the start of the dissemination of an update. The software supplier loads an updated version of the computer virus definition data file onto the FTP server 4. A manual or an automatic timed update of the mail gateway 10 then takes place that updates the version of the computer file on the mail gateway to #4. Subsequently, an e-mail message is issued by the workstation computer 16 destined for the workstation computer 24. The anti-virus software within the workstation computer 16 tags the e-mail header of the e-mail message with the version #3 of the computer virus definition data file that the workstation computer 16 is currently using. This e-mail message first passes through the local server 12 which is also using this same version #3 and so leaves the tag unaltered. When the e-mail message reaches the mail gateway 10, the mail gateway checks the tag within the e-mail message header and determines that it is itself using a more up-to-date version of the computer file in question and so replaces the tag with one that indicates that version #4 has been used and is available. The tag may also indicate whether or not that computer may itself serve as the source of the update data for other computers. This e-mail message then propagates via the internet 2 and through the mail gateway 18 and the local server 20 until it reaches the workstation computer 24. Each of the mail gateway 18, the local server 20 and the workstation computer 24 examines the tag within the e-mail message header and determines that it indicates the existence of a more up to date version of the computer virus definition data file than that which they are currently using. Accordingly, each of the mail gateway 18, the local server 20 and the workstation computer 24 is triggered (after an initial delay period) to download the updated version of the computer file from the FTP server 4 (a predetermined source of updates). The "*" indicates that a particular peer computer has detected that it should download an updated version of the computer file. The mail gateway 18, the local server 20 and the workstation computer 24 will continue to use version #3 until they have the updated version #4. The update mechanism used is preferably the pre-existing standard "pull" mechanism, but it is envisaged that alternative emergency or special purpose update mechanisms for use when triggered by a received tag could be provided.

Figure 3:
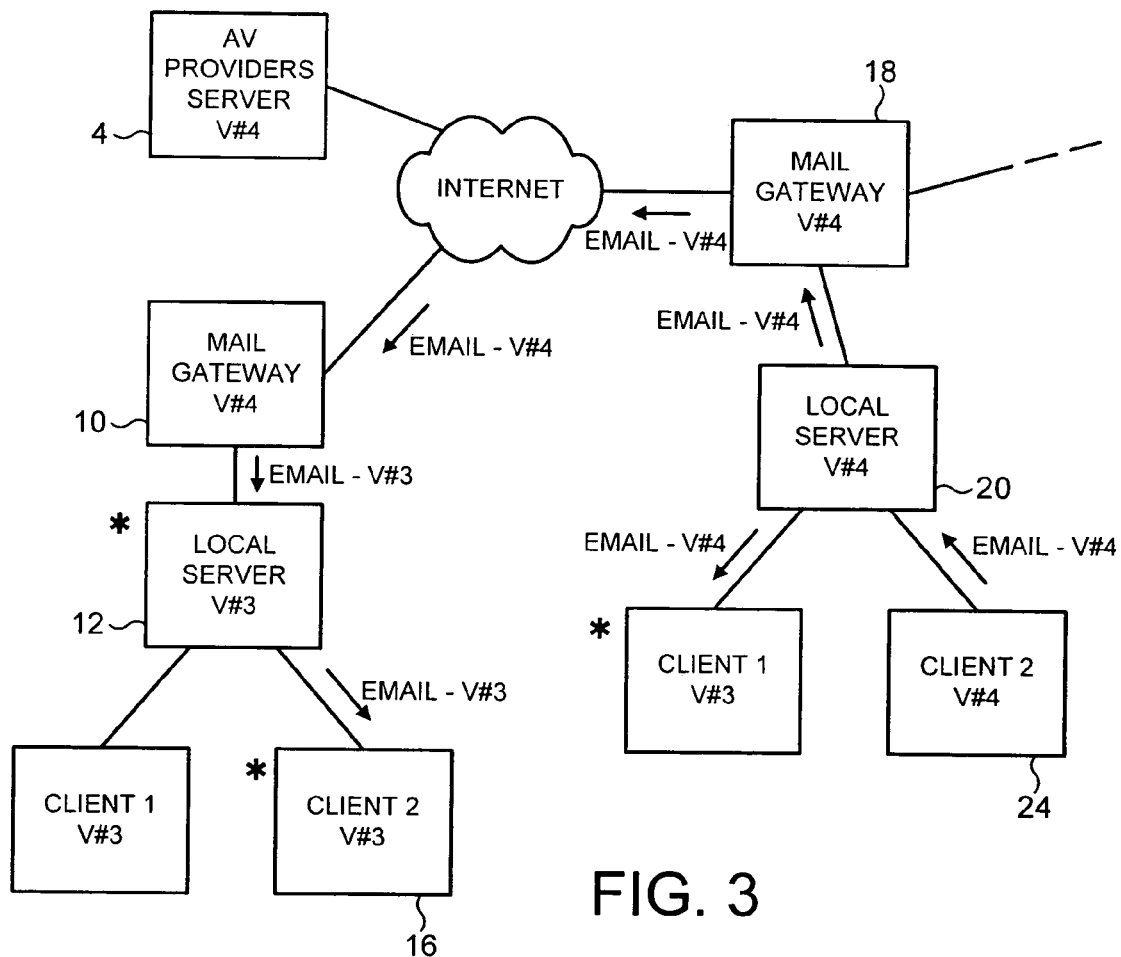

FIG. 3 shows the situation when the updates to the mail gateway 18, the local server 20 and the workstation computer 24 have all taken place. In the example shown, the user of the workstation computer 24 sends an e-mail message to the user of the workstation computer 16 that is also copied to the user of the workstation computer 22. As the workstation computer 24 that is the source of this e-mail message has now been updated to version #4, it includes within the header of the e-mail message a tag indicating that version #4 exists. When the workstation computer 22 receives this message, this is detected as indicating that the workstation computer 22 should download the updated version #4 from the FTP server 4. The e-mail message also propagates via the local server 20, the mail gateway 18 and the mail gateway 10 towards the other target recipient that is the workstation computer 16. All of these peer computers have already been updated, thus they do not action version #4 tags and below. The first computer reached in this transmission path that has not yet been updated is the local server 12 and the second is the workstation computer 16. Both of these computers also detect that the tag shows a version level #4 higher than that which they are currently using #3 and accordingly trigger the download of an update from the FTP server 4.

It will be appreciated that the mechanisms shown in FIGS. 1, 2 and 3 allow for the automatic and rapid dissemination of the information that an updated file exists. Furthermore, those computers that receive more e-mail messages are more likely to receive this notification sooner. These are the very computers that are generally at a high risk from computer viruses and accordingly it is appropriate that they should be the first that download the updated version of the computer virus definition data file. A little used computer will only download its update at a later time, and yet this will pose potentially lower level of risk since the little used computer is less likely to receive an infectious element.

Figure 4:
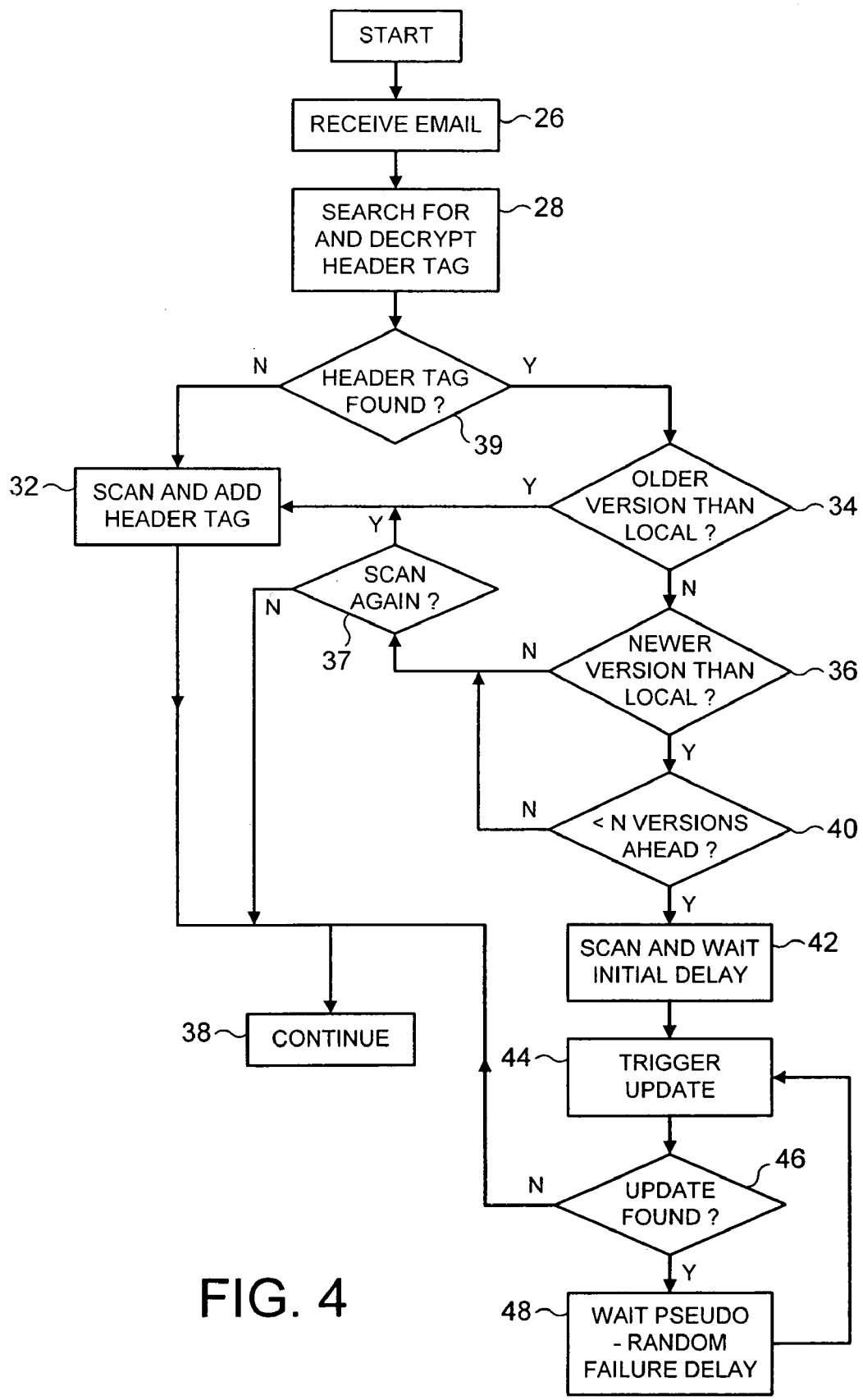
FIG. 4 is a flow diagram showing the processing performed by a peer computer of the type illustrated in FIGS. 1 to 3.

FIG. 4 is a flow diagram schematically illustrating the processing performed by a particular peer computer.

At step 26, the computer receives an e-mail message. At step 28 the computer searches the message header of the e-mail for any header tag present and decrypts this if it is found. In some embodiments the header tag may not be encrypted.

At step 30, a test is made as to whether any header tag has been found. If a header tag has not been found, then the e-mail message is scanned for computer viruses using the existing anti-virus software at its current level of update and a header tag added to the e-mail message indicative of that current level of update at step 32.

If a header tag is found at step 30, then step 34 tests whether or not that header tag indicates a version of the software that is older than that held by the computer performing the process illustrated in FIG. 4. If the received header tag is indicative of an older version, the processing proceeds to step 32 at which the e-mail message is scanned using what is known to be more up to date data than has previously been applied to that message and the header tag indicative of that more up to date data is added to the e-mail header. The existing tag indicative of the older version of the computer file may or may not be removed. The tag may also include parameters indicative of previous processing applied to the message, such as the program options set (e.g. all files, macro heuristics, all heuristics) on previous anti-virus scans applied to the message. These parameters can be used to determine whether or not further scanning is to be applied by the computer currently processing the message.

If the test at step 34 indicates that the received e-mail message included a header tag that was not older than the local version, then processing proceeds to step 36. Step 36 tests whether or not the tag of the received e-mail message indicates a newer version of the computer file is available. If a newer version is not available, then processing proceeds to step 37. Step 37 decided whether or not the message should be scanned at step 32 in dependence upon parameters set on the processing computer and parameters within the tag as mentioned above that indicate in more detail what previous scanning has been applied to the message. If the test at step 36 indicates that a newer version of the computer file than that stored by the local computer is available, then processing proceeds to step 40.

Step 40 tests how may versions ahead of the current version the tag within the received e-mail message indicates is available. If this number exceeds a predetermined threshold N, then this is indicative of some malfunction or malicious interference with the message tags and accordingly processing proceeds to step 32.

If the test at step 40 indicates that the updated version is less than the threshold number N ahead of the currently used version, then processing proceeds to step 42 which scans using the currently held version and then imposes an initial delay before processing proceeds to step 44 where an update attempt is triggered to download the updated version of the computer file from a remote source. The remote source may be an FTP server 4 linked via the internet 2 (or any other link) to the computer in question, or could be a server file location within a local area network 6, 8 or some other source.

At step 46, a test is made as to whether or not the update attempt has failed. If the update attempt has not failed, then processing continues with other normal e-mail processing operations at step 38.

If the update attempt has failed, then processing proceeds to step 48 which imposes a psuedo-random failure delay prior to returning processing to step 44 to attempt another update. A predetermined number of update attempt failures may trigger a user warning message.

Figures 5, 6:
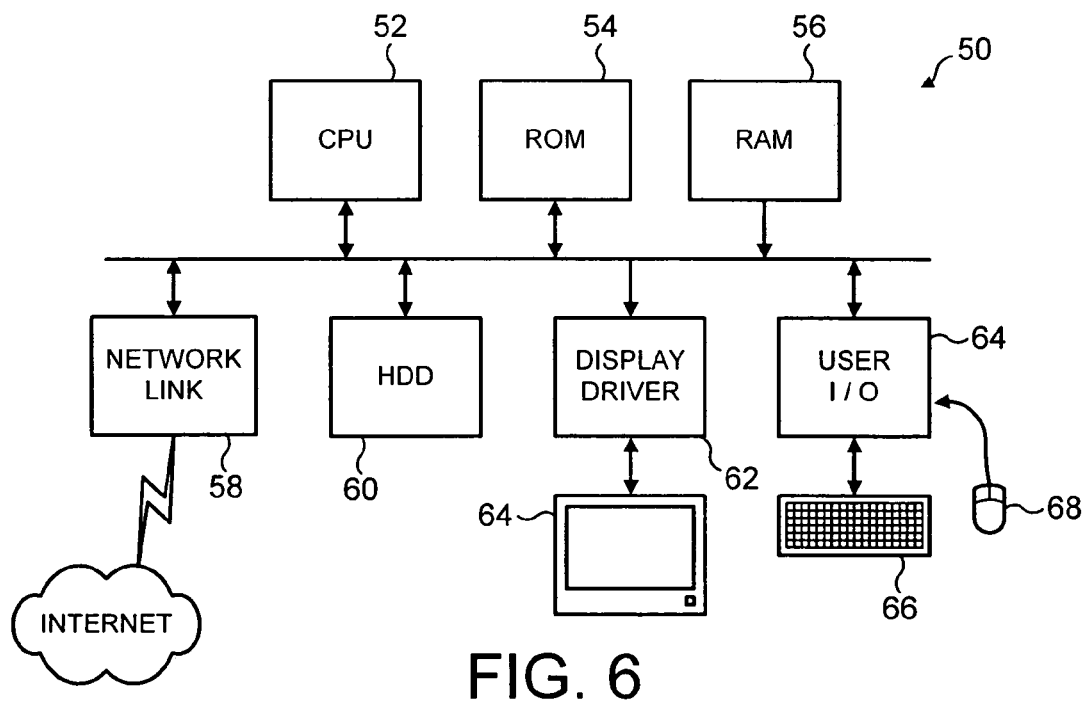
FIG. 5 schematically illustrates a tag of the type that may be inserted within an e-mail message header.
FIG. 6 illustrates a computer apparatus that may be used to implement the technique of the present invention.

FIG. 5 illustrates a message tag of the type that may be inserted within an Email message header. The "X-" prefix in the tag is one defined some in standard e-mail protocols as indicating that the information that follows on the line is for information purposes only and is not actively processed in normal systems. In the illustrated example, the tag starts with a coding for "McAfee-Sig:". This is a code sequence that is searched for by peer computers within e-mail message headers to detect the presence of a tag indicating what version levels of an anti-virus system have already been applied to that e-mail message. This version information follows in the form of "<S#-xxxE#-yyyD#-zzz>", portions of which respectively indicate the anti-virus software program version number, the computer virus detection engine version number and the computer virus definition data version number. In practice, this version information may be encrypted to make it more difficult to tamper with the information in an attempt to misdirect or interfere with the update mechanisms. Various known encryption techniques may be used. The tag could also include parameters indicating previously applied scan options or other data and could extend over more than one line.

FIG. 6 schematically illustrates a computer 50 of the type that may be used to implement the techniques described above (more simple appliance type devices could also be used). The computer 50 includes a central processing unit 52, a read only memory 54, a random access memory 56, a network link 58, a hard disk drive 60, a display driver 62, a display 64, a user input/output driver 64, a keyboard 66 and a mouse 68.

In operation, the central processing unit 52 executes computer programs stored upon the hard disk drive 60 or within the read only memory 54 using the random access memory as working memory. User inputs for controlling the computer 50 are received from the keyboard 66 and the mouse 68 via the user input/output unit 64. Processing results may be displayed to the user using the display 65 via the display driver unit 62.

In operation, an e-mail message may be received from the internet 2 via the network link 58 into an e-mail program being executed by the central processing unit 52. Part of this e-mail program may trigger an anti-virus scan of the received e-mail. This anti-virus scan includes the processing illustrated in FIG. 4 and accordingly detects if the received e-mail message includes the information that an updated version of any of the components of the anti-virus system exists for download. Should such updated versions exist, then they may be downloaded by the computer 50 under program control from a remote source, such as an FTP server 4, via the internet 2 and the network link 58.

The updated computer files, such as the anti-virus software program, the search engine program or the virus definitions, will typically then be stored on the hard disk drive 60 of the computer 50. The program that causes the processing of FIG. 4 to take place will also typically be stored upon the hard disk drive 60. The computer program may be distributed via a recordable medium, such as a floppy disk or a CD, or may itself be downloaded via the network link 58.

The computer 50 may pass the e-mail message onto another computer or may itself originate a new e-mail message. In either case, any outbound e-mail message is marked with a tag indicating the version levels of the anti-virus software components used by the computer 50 if these are more up to date than any indications already within the e-mail message.

Figure 7:
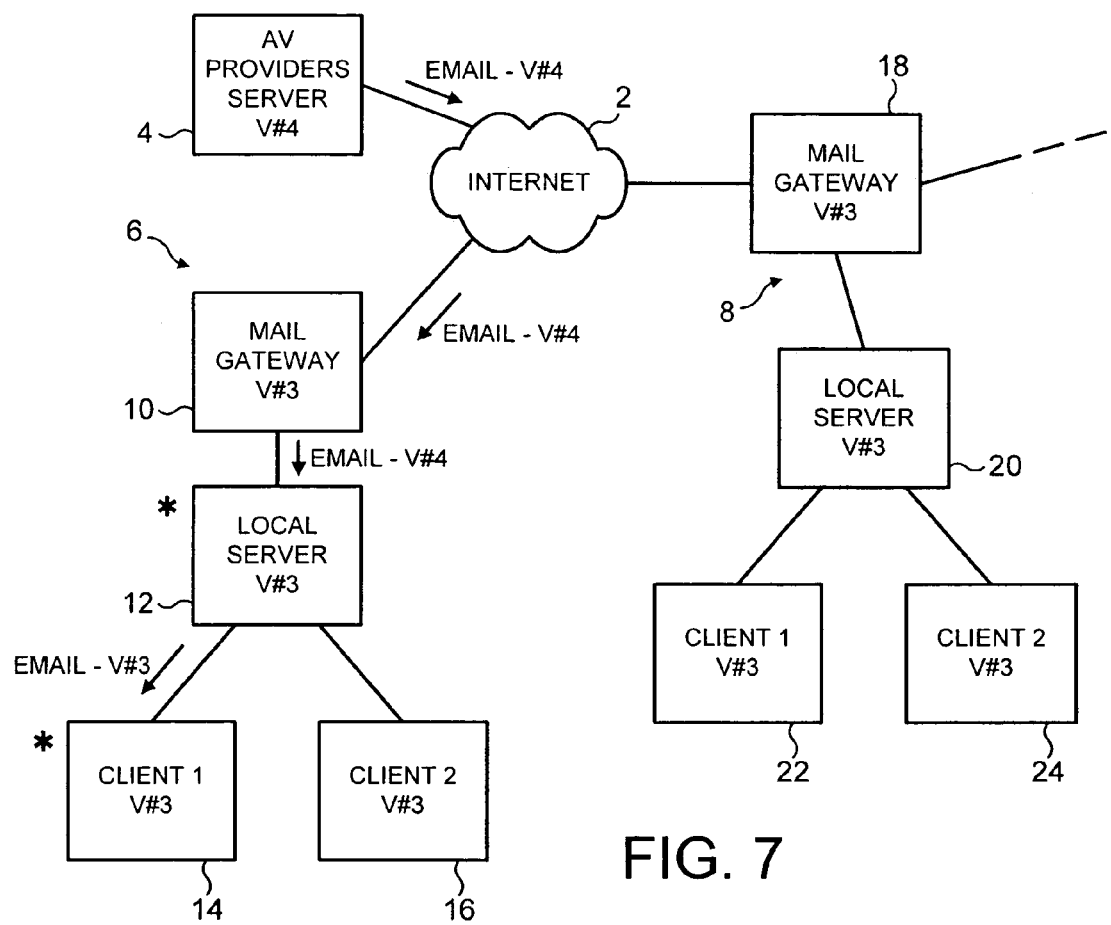
FIG. 7 schematically illustrates the triggering of an update by sending an e-mail message from the update provider.

FIG. 7 schematically illustrates a system which sends an e-mail message to a client workstation 14 to trigger updating of a computer file made available on the FTP server 4. As an example, a computer virus definition data file may be updated to include data defining a newly released computer virus. The computer virus definition data provider will then place this updated computer file on the FTP server 4, that server not necessarily using that computer file itself, but rather providing a storage location from which remote computers may download that computer file via the internet 2.

The FTP server 4, or possibly a different computer, will then read a database of e-mail addresses to which an e-mail is to be sent including a tag indicating that the new version #4 of the computer file is available for download. In this example, the e-mail message is sent to the client workstation 14 and passes to this client workstation 14 via the mail gateway 10 and the local server 12, all of which are using the previous version of this computer file, namely version #3. In accordance with the previously described techniques each of the mail gateway computer 10, the local server 12 and the client workstation computer 14 examines the tag within the e-mail header and notes that a more up to date version of the computer file in question is available for download and then triggers the update process (the update process could take a variety of different forms, such as local updates etc, and may incorporate load balancing provisions such as retrying a download after a random delay if a connection is refused). For example, in this way, the highly critical gateway 10 may be triggered by the provider themselves to start a pull download of the updated computer file as soon as it is available. The owner of the local area network 6 may pay a subscription to be so notified by the provider.

Figure 8:
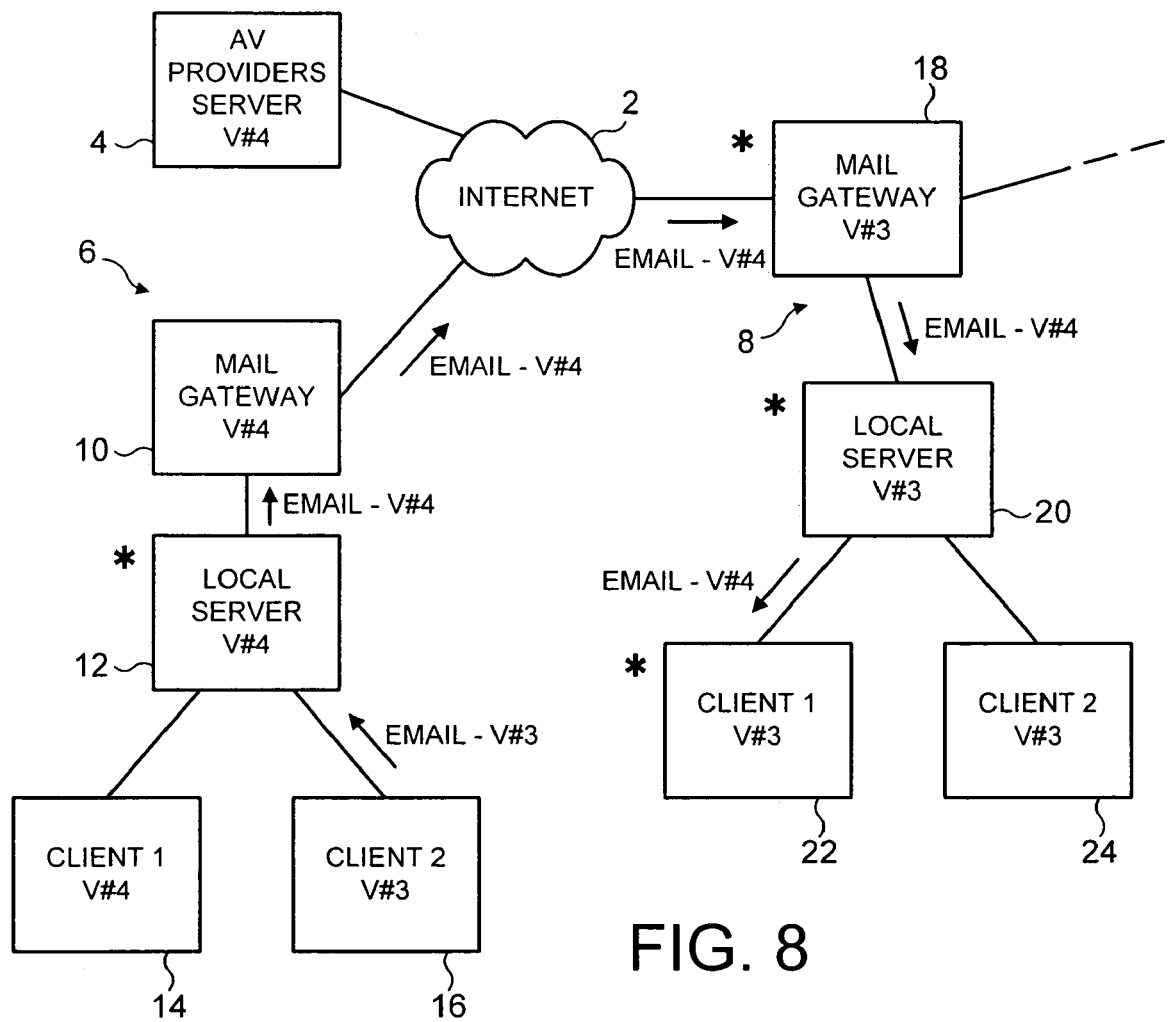
FIG. 8 schematically illustrates subsequent updating operation following the update of FIG. 7.

FIG. 8 illustrates subsequent operation in a manner similar to FIG. 2. In FIG. 8 the client workstation computer 16 sends an e-mail message to the client workstation computer 22. Since the first local area network 6 has had the local server 12 and the mail gateway 10 updated to the latest version of the computer file, i.e. version #4, as the e-mail message propagates along its path the tag within the header is updated to indicate that this latest version is available and accordingly the mail gateway computer 18, the local server 20 and the client workstation computer 22 all read this tag within the header and note that a more up to date version of the computer file is available, thus, these further computers may then initiate a pull download of the updated computer file from the FTP server 4. As an alternative, the provider may arrange that the software on the mail gateway 10 does not pass out the updated tag thereby preventing redistribution of the subscription service.

Figure 9:
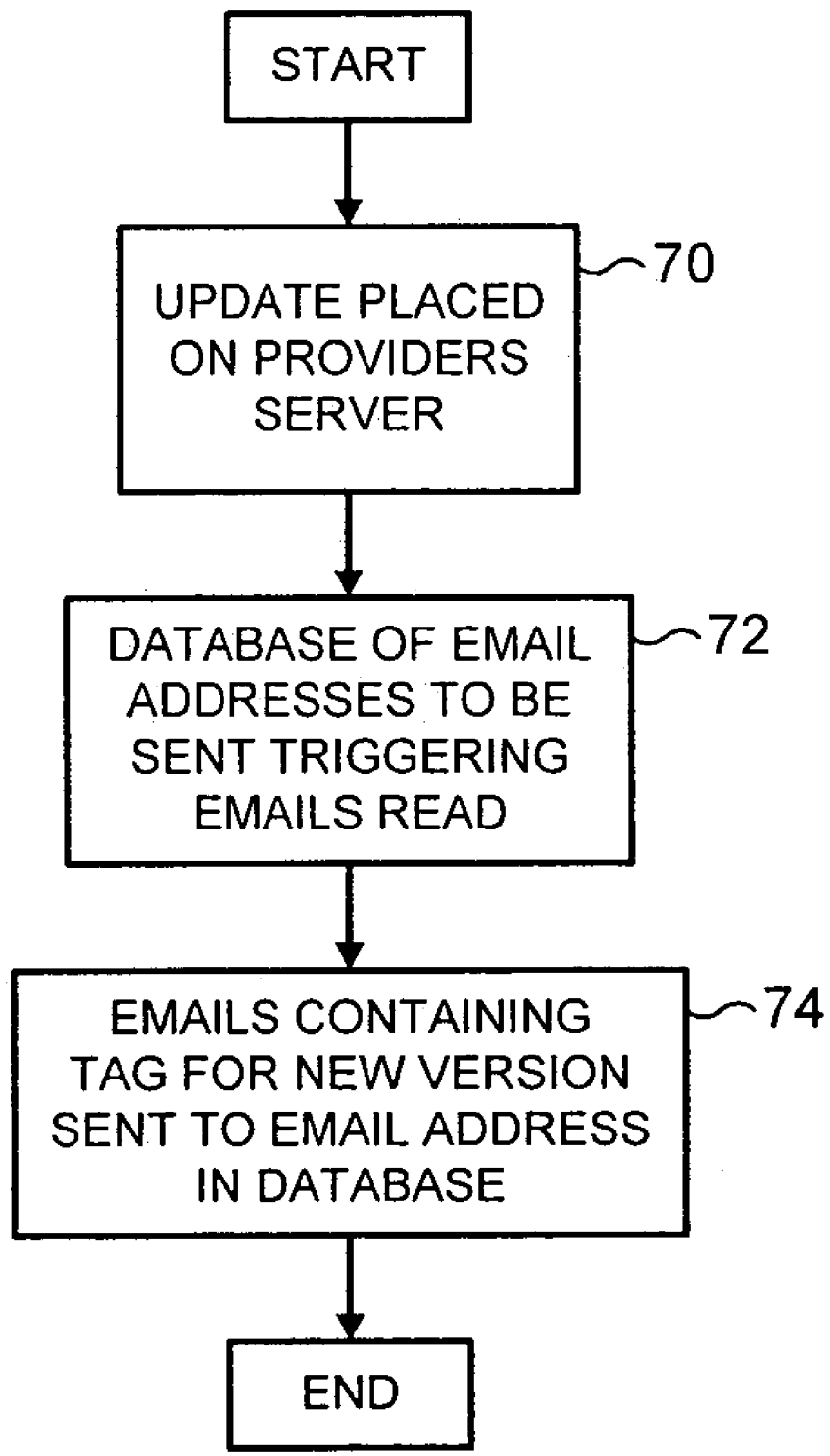
FIG. 9 is a flow diagram schematically illustrating the processing that may be performed by the provider's computer.

FIG. 9 schematically illustrates the processing that may be performed by the computer of the computer program provider. At step 70 the updated computer file is placed on the provider's server to be available for download via the internet. At step 72 the provider accesses their database of e-mail addresses to be sent triggering e-mails. The recipients of these e-mails may pay a subscription to be included within this database. The database may include a priority ordering which will control the timing at which the triggering e-mails are sent out from the provider, thus, the highest priority customers may be sent their triggering e-mails immediately, with lower priority customers being sent their e-mails after a predetermined delay, such as an hour, in order to allow the highest priority customers to obtain their updated versions of the computer files whilst the FTP server 4 is relatively lightly loaded. As previously mentioned, if a client computer is unable to connect to download the computer file, it may be arranged to automatically retry after a randomly chosen time delay.

Step 74 corresponds to the sending of the e-mails containing the tags relating to the availability of the new version of the computer file out to the customers as indicated by the e-mail addresses within the database. When this notification process is complete, then the process of FIG. 9 may terminate.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method performed by a provider of a computer file to trigger updating of said computer file used by a computer in a database of computers, said method comprising the steps of:

(i) providing an updated version of said computer file at a location from which it may be downloaded by said computer;

(ii) sending a tag indicative of availability of said updated computer file to said database of computers utilizing email addresses associated with computers in said database such that said tag is sent to said computers in said database utilizing said email addresses; and (iii) maintaining said database of computers to which said tag is to be sent when an updated version of said computer file is made available, wherein said database of computers includes priority data indicating a priority level associated with an address, said priority level being used to control how rapidly after said updated version of said computer file is made available said tag is sent to said database of computers, said priority level controlling selection of one of a plurality of different finite delay periods after said updated version of said computer file is made available following which said tag is sent to said database of computers;

wherein said tag includes data indicative of a version level of said computer file, data indicative of a version level of a software program associated with said computer file, and data indicative of a version level of an engine associated with said software program;

wherein said tag is encrypted;

wherein said tag is part of an e-mail message header;

wherein sending said tag to said database of computers further comprises:

transmitting said tag through at least one local server and at least one mail gateway connected to said computers in said database such that said at least one local server reads said tag to determine if said data indicative of said version level of said computer file is more recent than a second version level of a computer file located on said at least one local server, and further such that said at least one mail gateway reads said tag to determine if said data indicative of said version level of said computer file is more recent than a third version level of a computer file located on said at least one mail gateway;

if said tag includes data indicative of a more recent version level than said second version level of said computer file located on said at least one local server, said at least one local server initiating a download of said computer file associated with said tag; and if said tag includes data indicative of a more recent version level than said third version level of said computer file located on said at least one mail gateway, said at least one mail gateway initiating a download of said computer file associated with said tag.

2. A method as claimed in claim 1, wherein said computer is connected to said location via an internet link.

3. A method as claimed in claim 1, wherein computer file is computer virus definition data.

4. A method as claimed in claim 1, wherein said computer file is an anti-virus computer program file.

5. A method as claimed in claim 1, wherein sending of said tag upon availability of an updated version of said computer file is provided as a subscription service by said provider.

6. A computer program product recorded on a computer readable medium for use by a provider of a computer file to trigger updating of said computer file used by a computer said provider having provided an updated version of said computer file at a location from which it may be downloaded by said computer, said computer program product comprising:

(i) tag sending code operable to send a tag indicative of availability of said updated computer file to said computer utilizing an email address associated with said computer such that said tag is sent to said computer utilizing said email address; and (ii) database code operable to maintain a database of computers to which said tag is to be sent when an updated version of said computer file is made available, wherein said database includes priority data indicating a priority level associated with an address, said priority level being used to control how rapidly after said updated version of said computer file is made available said tag is sent to said computer, said priority level controlling selection of one of a plurality of different finite delay periods after said updated version of said computer file is made available following which said tag is sent to said database of computers;

wherein said tag includes data indicative of a version level of said computer file, data indicative of a version level of a software program associated with said computer file, and data indicative of a version level of an engine associated with said software program;

wherein said tag is encrypted;

wherein said tag is part of an e-mail message header;

wherein sending said tag to said computer further comprises:

transmitting said tag through a local server and a mail gateway connected to said computer such that said at least one local server reads said tag to determine if said data indicative of said version level of said computer file is more recent than a second version level of a computer file located on said at least one local server, and further such that said at least one mail gateway reads said tag to determine if said data indicative of said version level of said computer file is more recent than a third version level of a computer file located on said at least one mail gateway;

if said tag includes data indicative of a more recent version level than said second version level of said computer file located on said local server, said local server initiating a download of said computer file associated with said tag; and if said tag includes data indicative of a more recent version level than said third version level of said computer file located on said mail gateway, said mail gateway initiating a download of said computer file associated with said tag.

7. A computer program product as claimed in claim 6, wherein said computer is connected to said location via an internet link.

8. A computer program product as claimed in claim 6, wherein computer file is computer virus definition data.

9. A computer program product as claimed in claim 6, wherein said computer file is an anti-virus computer program file.

10. A computer program product as claimed in claim 6, wherein sending of said tag upon availability of an updated version of said computer file is provided as a subscription service by said provider.

11. Apparatus for use by a provider of a computer file to trigger updating of said computer file used by a computer said provider having provided an updated version of said computer file at a location from which it may be downloaded by said computer, said apparatus comprising:

(i) a tag sender operable to send a tag indicative of availability of said updated computer file to said computer utilizing an email address associated with said computer such that said tag is sent to said computer utilizing said email address; and (ii) database logic operable to maintain a database of computers to which said tag is to be sent when an updated version of said computer file is made available, wherein said database includes priority data indicating a priority level associated with an address, said priority level being used to control how rapidly after said updated version of said computer file is made available said tag is sent to said computer, said priority level controlling selection of one of a plurality of different finite delay periods after said updated version of said computer file is made available following which said tag is sent to said database of computers;

wherein said tag includes data indicative of a version level of said computer file, data indicative of a version level of a software program associated with said computer file, and data indicative of a version level of an engine associated with said software program;

wherein said tag is encrypted;

wherein said tag is part of an e-mail message header;

wherein sending said tag to said computer further comprises:

transmitting said tag through a local server and a mail gateway connected to said computer such that said at least one local server reads said tag to determine if said data indicative of said version level of said computer file is more recent than a second version level of a computer file located on said at least one local server, and further such that said at least one mail gateway reads said tag to determine if said data indicative of said version level of said computer file is more recent than a third version level of a computer file located on said at least one mail gateway;

if said tag includes data indicative of a more recent version level than said second version level of said computer file located on said local server, said local server initiating a download of said computer file associated with said tag; and if said tag includes data indicative of a more recent version level than said third version level of said computer file located on said mail gateway, said mail gateway initiating a download of said computer file associated with said tag.

12. Apparatus as claimed in claim 11, wherein said computer is connected to said location via an internet link.

13. Apparatus as claimed in claim 11, wherein computer file is computer virus definition data.

14. Apparatus as claimed in claim 11, wherein said computer file is an anti-virus computer program file.

15. Apparatus as claimed in claim 11, wherein sending of said tag upon availability of an updated version of said computer file is provided as a subscription service by said provider.

16. A method as claimed in claim 1, wherein said tag further includes parameter data indicating options previously applied to said e-mail message.

17. A method as claimed in claim 16, wherein said parameter data indicates scan options previously applied to said e-mail message including at least one of scan all files, scan utilizing macro heuristics, and scan utilizing all heuristics.

18. A method as claimed in claim 1, wherein each computer that receives said tag determines whether said data indicative of said version level of said computer file is more recent than said version level of a computer file located on said each computer, such that if said data indicative of said version level of said computer file is more recent, said each computer that receives said tag further determines whether said data indicative of said version level of said computer file is larger than a threshold number of versions ahead of said version level of said computer file located on said each computer, and if said threshold is met, said message is identified as possibly malicious and said e-mail message is scanned by said each computer.

* * * * *